United States Patent
Kim et al.

(10) Patent No.: US 8,348,733 B2
(45) Date of Patent: Jan. 8, 2013

(54) APPARATUS AND METHOD FOR ANALYZING CHARACTERISTIC OF GAME PLAYER IN REAL TIME

(75) Inventors: Hang Kee Kim, Daejeon (KR); Chang Joon Park, Daejeon (KR); Seong Won Ryu, Daejeon (KR); Hun Joo Lee, Daejeon (KR); Ki Suk Lee, Daejeon (KR); Kang Min Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 320 days.

(21) Appl. No.: 12/905,304

(22) Filed: Oct. 15, 2010

(65) Prior Publication Data
US 2011/0151953 A1    Jun. 23, 2011

(30) Foreign Application Priority Data

Dec. 21, 2009    (KR) .................. 10-2009-0127997
Jun. 18, 2010    (KR) .................. 10-2010-0057842

(51) Int. Cl.
*A63F 9/24*    (2006.01)
*A63F 13/00*    (2006.01)
*G06F 17/00*    (2006.01)
*G06F 19/00*    (2006.01)

(52) U.S. Cl. ............................. 463/1; 463/23
(58) Field of Classification Search .............. 463/1, 23
See application file for complete search history.

(56) References Cited

U.S. PATENT DOCUMENTS

| 6,106,395 A | * | 8/2000 | Begis .......................... 463/23 |
| 2007/0077992 A1 | | 4/2007 | Midgley et al. |
| 2008/0081692 A1 | * | 4/2008 | Pope et al. .................. 463/31 |

FOREIGN PATENT DOCUMENTS

| KR | 10-2005-0096791 A | 10/2005 |
| KR | 10-2005-0105080 A | 11/2005 |
| KR | 10-2005-0114773 A | 12/2005 |
| KR | 10-2006-0020004 A | 3/2006 |
| KR | 10-2007-0028971 A | 3/2007 |

* cited by examiner

*Primary Examiner* — William M. Brewster

(57) ABSTRACT

Provided are an apparatus and method for analyzing a characteristic of a game player in real time. The apparatus includes at least one individual action determiner for calculating a player characteristic value indicating a level or tendency of a game player by giving a first weight to game play data values resulting from game play of the game player, an accuracy determiner for comparing the player characteristic value and a value set by an administrator, and calculating an accuracy value of the individual action determiner, a comprehensive level determiner for calculating a final characteristic value indicating a level or tendency of the game player by giving a second weight to the player characteristic values calculated by the individual action determiners when the accuracy value do not exceed a reference value, and a characteristic value output unit for outputting the final characteristic value.

9 Claims, 4 Drawing Sheets

APPARATUS AND METHOD FOR ANALYZING CHARACTERISTIC OF GAME PLAYER IN REAL TIME

CROSS-REFERENCE TO RELATED APPLICATION

This application claims priority to and the benefit of Korean Patent Application No. 10-2009-0127997, filed Dec. 21, 2009, and Korean Patent Application No. 10-2010-0057842, filed Jun. 18, 2010, the disclosure of which is incorporated herein by reference in its entirety.

BACKGROUND

1. Field of the Invention

The present invention relates to an apparatus and method for analyzing a characteristic of a game player in real time, and more particularly, to a real-time game player characteristic analysis apparatus and method capable of accurately determining a level and tendency of a game player in real time.

2. Discussion of Related Art

In computer games, it is important for a game service to find a level and tendency of a game player. Conventionally, a game player personally inputs his/her level and tendency, or a level and tendency are determined according to a particular rule.

Such a level and tendency of a game player can express a person good at the corresponding computer game and a person poor at the computer game by scalar values such as a beginning level, an intermediate level and an advanced level. According to the level and tendency of a game player, a provided game environment may vary.

However, even if the same identification (ID) is used to play a computer game, a player may vary, and the player's proficiency may also vary. Furthermore, the level of a player may vary every moment. For example, the level of a player may become much higher than that originally detected if the playing style of the game player matches a current game situation, or may be lowered if the playing style of the game player does not match the current game situation. According to such a situational change, it is necessary to find the level and tendency of a game player in real time.

SUMMARY OF THE INVENTION

The present invention is directed to accurately finding a level and tendency of a game player in real time by hierarchically learning levels and tendencies of the game player.

The present invention is also directed to increasing the degree of adaptation of a game player to a game and keeping the game player strained and immersed in the game by adjusting the difficulty of the game according to the level of the game player.

The present invention is also directed to providing a game player matching service and an appropriate guide or training scenario according to the level of a game player.

One aspect of the present invention provides an apparatus for analyzing a characteristic of a game player in real time including: at least one individual action determiner for calculating a player characteristic value indicating a level or tendency of a game player by giving a first weight to game play data values resulting from game play of the game player; an accuracy determiner for comparing the player characteristic value and a value set by an administrator, and calculating an accuracy value of the individual action determiner; a comprehensive level determiner for calculating a final characteristic value indicating a level or tendency of the game player by giving a second weight to the player characteristic values calculated by the individual action determiners when the accuracy value does not exceed a reference value; and a characteristic value output unit for outputting the final characteristic value.

Another aspect of the present invention provides a method of analyzing a characteristic of a game player in real time including: calculating a player characteristic value indicating a level or tendency of a game player by giving a first weight to game play data values resulting from game play of the game player; comparing the player characteristic value and a value set by an administrator, and calculating an accuracy value; calculating a final characteristic value indicating a level or tendency of the game player by giving a second weight to the player characteristic values when the accuracy value does not exceed a reference value; and outputting the final characteristic value.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Figure 1:
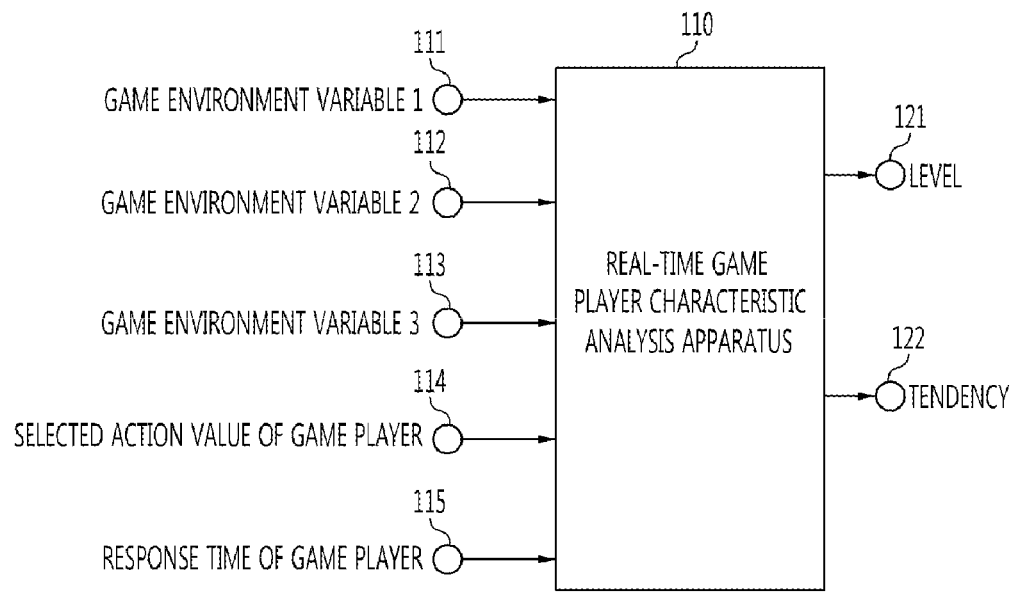
FIGS. 1 and 2 illustrate an apparatus for analyzing a characteristic of a game player in real time according to an exemplary embodiment of the present invention.
Figure 2:
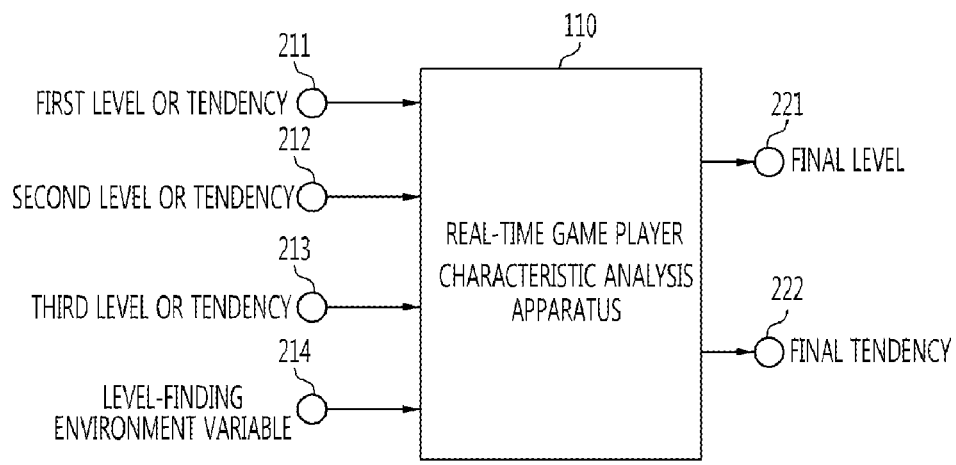

FIGS. 1 and 2 illustrate an apparatus for analyzing a characteristic of a game player in real time according to an exemplary embodiment of the present invention.

An apparatus 110 for analyzing a characteristic of a game player in real time according to an exemplary embodiment of the present invention determines whether the accuracy of a result value calculated by giving a weight to an input simulation data value exceeds a previously set value. At this time, the apparatus 110 compares the result value and a simulation result value to calculate the accuracy. The more similar the result value and the simulation result value, the higher the accuracy.

When it is determined that the accuracy of the result value exceeds the previously set value, the apparatus 110 calculates a characteristic value using the weight.

As illustrated in FIG. 1, the apparatus 110 gives the weight to game play data values 111, 112, 113, 114 and 115 resulting from game play of a game player, thereby calculating a player characteristic value indicating a level or tendency of the game player.

Game play data values according to an exemplary embodiment of the present invention denote game environment values of a game player, such as game environment variables 111, 112 and 113, a selected action value 114 of the game player, a response time value 115 of the game player, and so on. Characteristic values of a game player denote a level value 121 indicating the level of the game player, a tendency value 122 indicating the tendency of the game player, and so on.

For example, time that passes after a character of the game player has encountered an enemy, the number of times that the character shoots the enemy, the accuracy of the shots, whether or not the character is covered by a cover, etc. is input to the apparatus 110 as a game play data value, and a level value, a tendency value, etc. indicating how the game player plays the game can be output. In other words, the apparatus 110 for analyzing a characteristic of a game player in real time according to an exemplary embodiment of the present invention can find a characteristic, such as a level or tendency, of a game player according to a behavior pattern dependent on the situation of the game player. Here, the apparatus 110 can analyze a characteristic value of a game player on the basis of one of a neural network, a multilayer perceptron (MLP), a genetic algorithm, a hidden Markov model (HMM), a Markov random field (MRF), a distributed system object model (DSOM), a fuzzy method, an evolution method, and a reinforcement method.

When the apparatus 110 analyzes the level or tendency of a game player and the corresponding game is simple, the apparatus 110 can efficiently analyze the level or tendency. On the other hand, when the game is not simple, a dimension increases with increases in the number of input play data values and the number of output characteristic values of the game player. Thus, analysis performance rapidly deteriorates, and it is difficult to find the level or tendency of the game player in real time. Also, an unnecessary play data value may be taken into consideration, and an incorrect output value may be obtained.

For these reasons, a process of calculating a player characteristic value is divided in an exemplary embodiment of the present invention. For example, when the number of game play data input values input to the apparatus 110 is 20 and the number of output values is three, hidden=input*1.5=20*1.5=30, 20*hidden+hidden*3=20*30+30*3=690, and thus 690 links are generated. On the other hand, when 20 inputs are divided into two groups of ten inputs each and the respective groups are input to first and second modules, (10*15+15*3)*2=390, and thus 390 links are generated. Also, when the number of outputs of each of the first and second modules is three and all the six outputs of the first and second modules are input to a third module, 6*9+9*3=81, and thus 81 links are generated. As a result, 390+81=471, and a total of 471 links are generated. As described above, when a module is divided into smaller modules, the number of links is reduced, and performance can be improved.

Thus, in an exemplary embodiment of the present invention, the apparatus 110 divides the process of calculating a characteristic value of a game player into two processes as illustrated in FIGS. 1 and 2, thereby analyzing a characteristic, such as a level or tendency, of a game player in real time. In other words, the apparatus 110 calculates player characteristic values 121 or 122 indicating the level or tendency of a game player as illustrated in FIG. 1, and gives a weight to calculated player characteristic values 211, 212, 213 and 214 to determine a final level 221 or a final tendency 222 of the game player as illustrated in FIG. 2.

Also, in an exemplary embodiment of the present invention, the apparatus 110 may compare the calculated player characteristic value with a value previously set by an administrator to calculate an accuracy value, and may calculate a final characteristic value using a plurality of player characteristic values only when the calculated accuracy value does not exceed the reference value.

To be specific, the apparatus 110 calculates a player characteristic value, compares the calculated player characteristic value with a value previously set by an administrator to calculate an accuracy value, and outputs a characteristic value such as the level 121 or the tendency 122 of a game player as shown in FIG. 1 when the calculated accuracy value exceeds the reference value. On the other hand, when the calculated accuracy value does not exceed the reference value, each of a plurality of real-time game player characteristic analysis apparatuses shown in FIG. 1 receives input game play data and performs a player characteristic value calculation process, and as illustrated in FIG. 2, a real-time game player characteristic analysis apparatus gives a weight to the calculated player characteristic values 211, 212 and 213, the variable 214, etc., thereby calculating a final characteristic value 221 or 222 indicating the level or tendency of the game player. For example, when the calculated accuracy value does not exceed 90%, a final characteristic value calculation process as illustrated in FIG. 2 is additionally performed.

It will be described in detail below how the apparatus 110 calculates an accuracy value.

As shown in Equation 1 below, the apparatus 110 calculates an accuracy value using a value set by an administrator and a player characteristic value calculated by the apparatus 110 itself.

$$\text{Accuracy} = (\text{Maximum} - |\text{Value Set by Administrator} - \text{Player Characteristic Value}|)/(\text{Maximum} - \text{Minimum})*100(\%) \quad \text{[Equation 1]}$$

As shown in Equation 1, the smaller a difference between the value set by an administrator and the player characteristic value of the apparatus 110, the higher the accuracy value. For example, when a level determination value of a specific game player ranges from 0 to 1, the value set by an administrator is 0.9, and the player characteristic value calculated by the apparatus 110 is 0.8, (1−|0.9−0.8|)/(1.0−0.0)*100(%)=90%, that is, accuracy is calculated to be 90%.

When the accuracy value is sufficiently high as calculated above, the apparatus 110 finishes operation after calculating a characteristic value indicating the level 121 or the tendency 122 of a game player as illustrated in FIG. 1. On the other hand, when the calculated accuracy value is low, the apparatus 110 calculates a plurality of player characteristic values, and inputs the calculated player characteristic values to calculate final characteristic values, that is, the final level 221 and the final tendency 222 of the game player. For example, when the accuracy of the calculated characteristic value is 90% or above, the calculated characteristic value has high reliability. Thus, after calculating the player characteristic value once, the apparatus 110 outputs the calculated player characteristic value and finishes operation, and the process of calculating a final characteristic value using a plurality of player characteristic values does not need to be performed.

To improve such accuracy, an input simulation data value may be changed (e.g., an absolute position value of a game player's character input by the game player is changed to a relative position value of the character), or the simulation data value may be changed to an appropriate value by normalizing values such as response times, selected actions, or game environments, or preprocessing the values into an average value.

Figure 3:
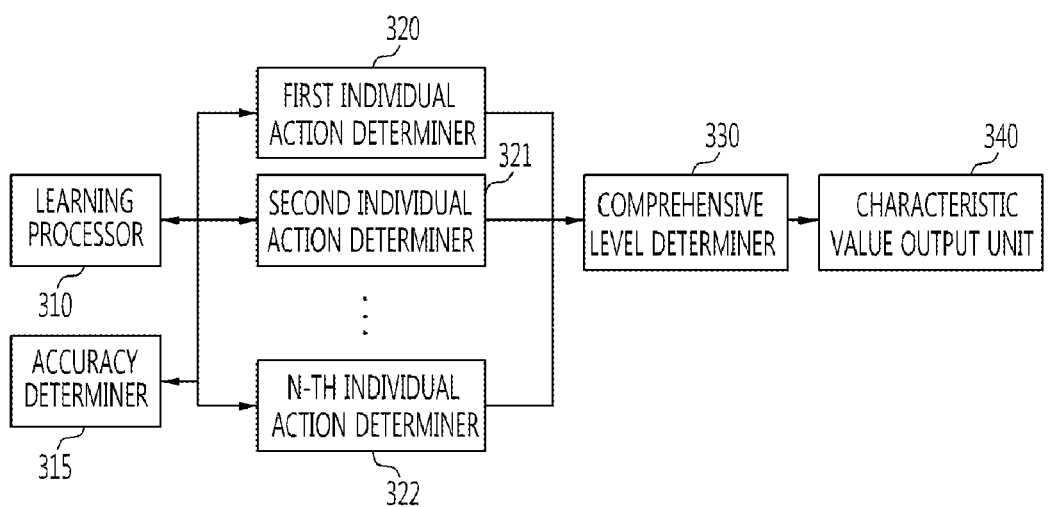
FIG. 3 is a block diagram of an apparatus for analyzing a characteristic of a game player in real time according to an exemplary embodiment of the present invention.

FIG. 3 is a block diagram of an apparatus for analyzing a characteristic of a game player in real time according to an exemplary embodiment of the present invention. A constitution of the apparatus for analyzing a characteristic of a game player in real time according to an exemplary embodiment of the present invention will be described with reference to FIG. 3.

The apparatus 110 for analyzing a characteristic of a game player in real time according to an exemplary embodiment of the present invention includes a learning processor 310, an accuracy determiner 315, a plurality of individual action determiners 320, 321 and 322, a comprehensive level determiner 330, and a characteristic value output unit 340.

The learning processor 310 inputs a simulation data value to the individual action determiners 320, 321 and 322 to give a random weight to the simulation data value and calculate a result value, and the accuracy determiner 315 compares the calculated result value with a simulation result value to calculate an accuracy value. The learning processor 310 sets the individual action determiners 320, 321 and 322 to select and use the random weight when the calculated accuracy value exceeds a previously set value. Likewise, the learning processor 310 causes the comprehensive level determiner 330 to calculate a result value using a random weight, and the accuracy determiner 315 to compare the calculated result value with a simulation result value and calculate an accuracy value. The learning processor 310 sets the comprehensive level determiner 330 to select and use the random weight when the calculated accuracy value exceeds a previously set value.

The individual action determiners 320, 321 and 322 give a weight, which is set as described above, to game play data values resulting from game play of a game player, thereby calculating a player character value indicating the level or tendency of the game player.

The accuracy determiner 315 compares the player characteristic value with a value set by an administrator and calculates an accuracy value of the individual action determiners 320, 321 and 322.

When the calculated accuracy value does not exceed a reference value, the comprehensive level determiner 330 performs a calculation process again using the player characteristic values calculated by the individual action determiners 320, 321 and 322. In other words, the comprehensive level determiner 330 gives a weight to the characteristic values calculated by the individual action determiners 320, 321 and 322 to calculate a final characteristic value of the game player. Here, the final characteristic value denotes the level or tendency of the game player.

The characteristic value output unit 340 outputs the player characteristic value calculated by the individual action determiners 320, 321 and 322, or the final characteristic value calculated by the comprehensive level determiner 330.

Here, the play data value denotes a variety of data, such as a response time value, a selected action value, or a game environment value of the game player, generated when the game player plays the game, and the player characteristic value and the final characteristic value of the game player are level values indicating the level of the game player or tendency values indicating the tendency of the game player.

Meanwhile, when it is determined that the accuracy value calculated by the accuracy determiner 315 exceeds the reference value, the characteristic value output unit 340 outputs the player characteristic value calculated by the individual action determiners 320, 321 and 322.

For example, the learning processor 310 sets a weight, and the first individual action determiner 320 gives the weight to game play data values of the game player to calculate a player characteristic value. The comprehensive level determiner 330 compares the player characteristic value with the value set by the administrator and calculates an accuracy value of the first individual action determiner 320. When the accuracy determiner 315 determines that the accuracy value of the first individual action determiner 320 exceeds the reference value, a player characteristic value calculated by inputting a game play data value to the first individual action determiner 320 is output through the characteristic value output unit 340.

On the other hand, when the accuracy determiner 315 determines that the accuracy value of the first individual action determiner 320 does not exceed the reference value, the comprehensive level determiner 330 calculates a final characteristic value of the game player using the player characteristic values calculated by the individual action determiners 320, 321 and 322, and the characteristic value output unit 340 outputs the calculated final characteristic value.

In an exemplary embodiment of the present invention, the individual action determiners 320, 321 and 322 and the comprehensive level determiner 330 can calculate a characteristic value of the game player on the basis of one of a neural network, an MLP, a genetic algorithm, an HMM, an MRF, a DSOM, a fuzzy method, an evolution method, and a reinforcement method.

Figure 4:
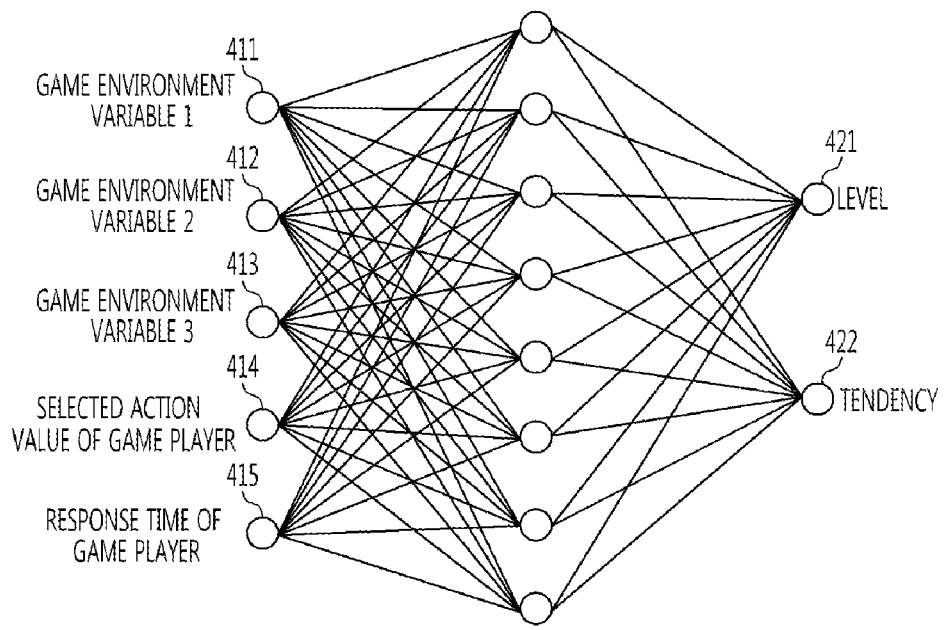
FIGS. 4 and 5 illustrate a real-time game player characteristic analysis apparatus constituted of a neural network according to an exemplary embodiment of the present invention.
Figure 5:
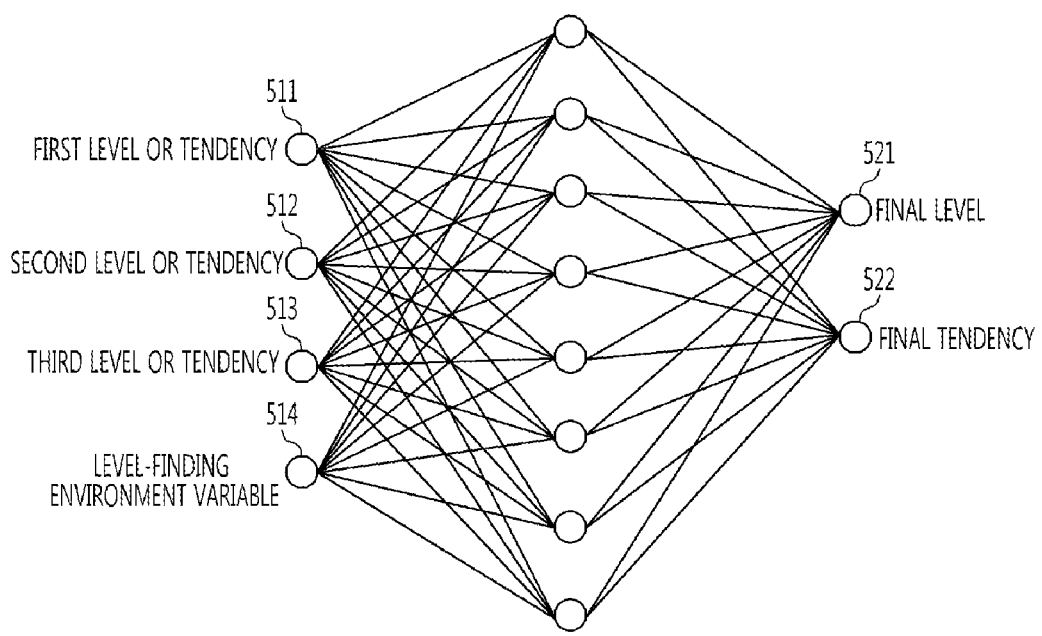

FIGS. 4 and 5 illustrate a real-time game player characteristic analysis apparatus constituted of a neural network according to an exemplary embodiment of the present invention.

The apparatus 110 constituted of a neural network according to an exemplary embodiment of the present invention will be described below with reference to FIGS. 4 and 5, but is not limited to the constitution based on a neural network.

As shown in FIG. 4, the apparatus 110 according to an exemplary embodiment of the present invention is constituted of a neural network, and gives a weight to game environment values, such as game environment variables 411, 412 and 413, and player characteristic values, such as a selected action value 414 and a response time value 415 of a game player, to calculate a level 421 and a tendency 422 of the game player. The weight is selected when an accuracy value calculated after the apparatus 110 receives a simulation data value, calculates a result value, and compares the result value and a simulation result value, is high.

Also, the apparatus 110 according to an exemplary embodiment of the present invention inputs the level value 421 and the tendency value 422 of the game player calculated by the neural network shown in FIG. 4 as level or tendency values 511, 512 and 513 as shown in FIG. 5, inputs an environment variable value 514, and gives a weight to the input values, thereby calculating a final level 521 and a final tendency 522 of the game player.

Furthermore, a position value of a character of the game player or an object is input to the apparatus 110 in a method varying according to whether the position value of the character or object is a relative position value or an absolute position value, or whether the game is a two-dimensional (2D) game or a three-dimensional (3D) game. Thus, when an absolute position value is input in an exemplary embodiment of the present invention, a current position value is normalized for use with a movement range set from 0 to 1. On the other hand, when a relative position value is input, the current position value is normalized for use with a difference or the maximum distance between a reference position value and the current position value set to 1.

The level of a game player calculated by the apparatus 110 constituted of a neural network may be indicated by 0 to 1. The lower the value, the lower the level of the game player. The higher the value, the higher the level. Also, the tendency of the game player may be referred to as an offensive type, defensive type, offensive and defensive type, etc. When the tendency is indicated by 0 to 1, the offensive type, defensive type, offensive and defensive type, etc. may be indicated by 0, 1, 0.5, etc., respectively.

The apparatus 110 constituted of a neural network receives game play information on a game player in real time, and outputs level or tendency information on the game player according to the game play information.

Figure 6:
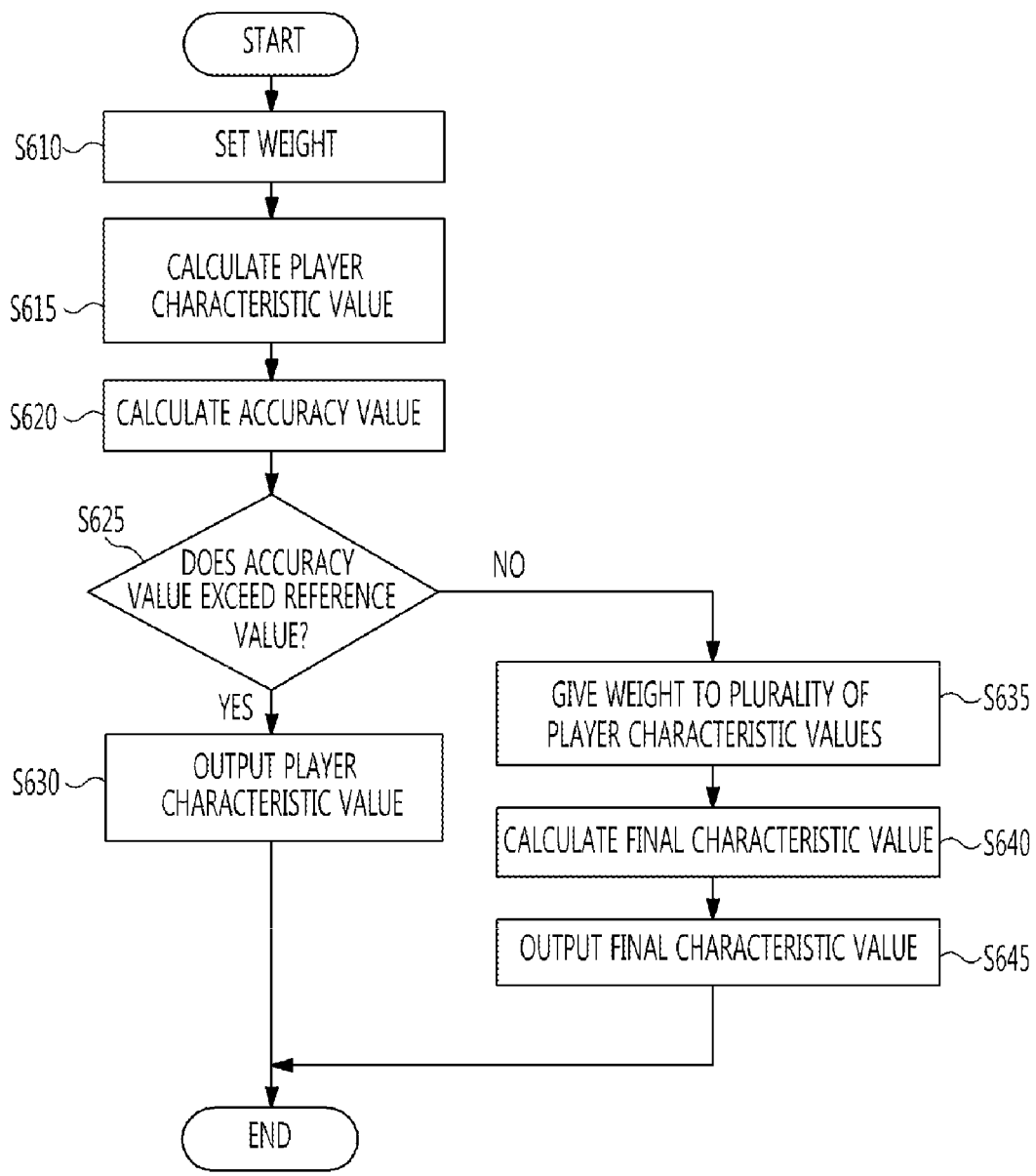
FIG. 6 is a flowchart illustrating a method of analyzing a characteristic of a game player in real time according to an exemplary embodiment of the present invention.

FIG. 6 is a flowchart illustrating a method of analyzing a characteristic of a game player in real time according to an exemplary embodiment of the present invention.

As illustrated in FIG. 6, a real-time game player characteristic analysis apparatus sets a weight (S610). To be specific, the real-time game player characteristic analysis apparatus receives a simulation data value, gives a random weight to the simulation data value to calculate a result value, and compares the calculated result value with a simulation result value to calculate an accuracy value. When the calculated accuracy value exceeds a previously set value, the real-time game player characteristic analysis apparatus selects and uses the random weight as a weight.

After this, the real-time game player characteristic analysis apparatus gives the weight to game play data values resulting from game play of a game player, thereby calculating a player characteristic value (S615).

Also, the real-time game player characteristic analysis apparatus compares the calculated player characteristic value and a value set by an administrator, thereby calculating an accuracy value (S620).

The real-time game player characteristic analysis apparatus determines whether the accuracy value exceeds a reference value (S625). When the calculated accuracy value exceeds the reference value, the real-time game player characteristic analysis apparatus outputs the calculated player characteristic value (S630). To be specific, since the accuracy value exceeds the reference value, the calculated player characteristic value is determined to be sufficiently reliable and thus is output without calculating a final characteristic value using a plurality of player characteristic values.

Here, the play data values may be at least one of response time values, selected action values, and game environment values of the game player, and each of the player characteristic value and the final characteristic value of the game player is at least one of a level value indicating the level of the game player and a tendency value indicating the tendency of the game player.

Meanwhile, when it is determined that the calculated accuracy value does not exceed the reference value, the real-time game player characteristic analysis apparatus gives the weight to the plurality of player characteristic values to calculate a final characteristic value of the game player (S635 and S640), and outputs the calculated final characteristic value (S645).

In an exemplary embodiment of the present invention, the real-time game player characteristic analysis apparatus can calculate a characteristic value of the game player on the basis of one of a neural network, an MLP, a genetic algorithm, an HMM, an MRF, a DSOM, a fuzzy method, an evolution method, and a reinforcement method.

In an exemplary embodiment, of the present invention, it is possible to accurately determine a level and tendency of a game player in real time by hierarchically learning levels and tendencies of the game player in real time and.

Consequently, in an exemplary embodiment of the present invention, it is possible to increase the degree of adaptation of a game player to a game and keep the game player strained and immersed in the game by adjusting the difficulty of the game according to a level of the game player. Also, it is possible to provide a game player matching service and an appropriate guide or training scenario according to the level of a game player.

The above-described exemplary embodiments of the present invention may be implemented in various ways. For example, the exemplary embodiments may be implemented using hardware, software, or a combination thereof. The exemplary embodiments may be coded as software executable on one or more processors that employ any one of a variety of operating systems or platforms. Additionally, such software may be written using any of a number of suitable programming languages, and also may be compiled as executable machine language code or intermediate code that is executed on a framework or virtual machine.

Also, the present invention may be embodied as a computer readable medium (e.g., a computer memory, one or more floppy discs, compact discs, optical discs, magnetic tapes, flash memories) storing one or more programs that perform methods for implementing the various embodiments of the present invention discussed above when executed on one or more computers or other processors.

Using an exemplary embodiment of the present invention, it is possible to accurately determine a level and tendency of a game player in real time by hierarchically learning levels and tendencies of the game player.

Also, it is possible to increase the degree of adaptation of a game player to a game and keep the game player strained and immersed in the game by adjusting the difficulty of the game according to the level of the game player.

Furthermore, it is possible to provide a game player matching service and an appropriate guide or training scenario according to the level of a game player.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for analyzing a characteristic of a game player in real time, comprising:
   at least one individual action determiner for calculating a player characteristic value indicating a level or tendency of a game player by giving a first weight to game play data values resulting from game play of the game player;
   an accuracy determiner for comparing the player characteristic value and a value set by an administrator, and calculating an accuracy value of the individual action determiner;
   a comprehensive level determiner for calculating a final characteristic value indicating a level or tendency of the game player by giving a second weight to the player characteristic values calculated by the individual action determiners when the accuracy value does not exceed a reference value; and a characteristic value output unit for outputting the final characteristic value.

2. The apparatus of claim 1, wherein the characteristic value output unit outputs the player characteristic value calculated by the individual action determiner when the accuracy value calculated by the accuracy determiner exceeds the reference value.

3. The apparatus of claim 1, further comprising a learning processor for inputting a simulation data value to the individual action determiner, controlling the individual action determiner to calculate a result value by giving the first weight to the simulation data value, controlling the accuracy, determiner to compare the result value and a simulation result value and calculate an accuracy value, and setting the individual action determiner to use the first weight when the calculated accuracy value exceeds a previously set value.

4. The apparatus of claim 3, wherein the learning processor inputs a simulation data value to the comprehensive level determiner, controls the comprehensive level determiner to calculate a result value by giving the second weight to the simulation data value, controls the accuracy determiner to compare the result value and a simulation result value and calculate an accuracy value, and sets the individual action determiner to use the second weight when the calculated accuracy value exceeds a previously set value.

5. The apparatus of claim 1, wherein the individual action determiner calculates the player characteristic value by normalizing the game play data values or preprocessing the game play data values into an average value.

6. The apparatus of claim 1, wherein the play data values are at least one of response time values, selected action values, and game environment values of the game player, and each of the player characteristic value and the final characteristic value of the game player is at least one of a level value indicating a level of the game player and a tendency value indicating a tendency of the game player.

7. The apparatus of claim 1, wherein the at least one of the individual action determiner and the comprehensive level determiner calculates the player characteristic value or the final characteristic value on the basis of at least one of a neural network, a multilayer perceptron (MLP), a genetic algorithm, a hidden Markov model (HMM), a Markov random field (MRF), a distributed system object model (DSOM), a fuzzy method, an evolution method, and a reinforcement method.

8. A method of analyzing a characteristic of a game player in real time, comprising:

calculating a player characteristic value indicating a level or tendency of a game player by giving a first weight to game play data values resulting from game play of the game player;

comparing the player characteristic value and a value set by an administrator, and calculating an accuracy value;

calculating a final characteristic value indicating a level or tendency of the game player by giving a second weight to the player characteristic values when the accuracy value does not exceed a reference value; and outputting the final characteristic value.

9. The method of claim 8, further comprising, before calculating a player characteristic value, setting the first weight or the second weight to be used when a result value calculated by giving the first weight or the second weight to a simulation data value exceeds a previously set value.

* * * * *